United States Patent
Engel et al.

(10) Patent No.: US 6,820,110 B1
(45) Date of Patent: Nov. 16, 2004

(54) DATA LINK BETWEEN TWO COMPUTERS AND METHOD FOR TRANSMITTING DATA BETWEEN SAID COMPUTERS

(75) Inventors: Thomas Engel, Trier (DE); Ernst-Georg Haffner, Gusenburg (DE); Christoph Meinel, Gusterath (DE)

(73) Assignee: Institut fur Telematik E.V., Trier (DE)

( * ) Notice: Subject to any disclaimer, the term of this patent is extended or adjusted under 35 U.S.C. 154(b) by 0 days.

(21) Appl. No.: 09/744,999

(22) PCT Filed: Jul. 31, 1999

(86) PCT No.: PCT/EP99/05550
§ 371 (c)(1),
(2), (4) Date: Feb. 22, 2001

(87) PCT Pub. No.: WO00/11846
PCT Pub. Date: Mar. 2, 2000

(30) Foreign Application Priority Data

Aug. 22, 1998 (DE) .......................... 198 38 253

(51) Int. Cl.[7] .................. G06F 15/16; G06F 15/173
(52) U.S. Cl. .................. 709/200; 709/232; 709/238; 709/227; 709/228
(58) Field of Search ................. 709/225, 227, 709/228, 231–232, 238–240

(56) References Cited

U.S. PATENT DOCUMENTS 6,058,168 A * 5/2000 Braband .................. 379/93.24

OTHER PUBLICATIONS

"The Internet, from access to Zine". Deborah Mills–scofield. XT&T Tecinology. pp. 2–9.*

"The Internet, from Access to Zine", Deborah Mills–Scofield, AT & T Technology, pp. 2–9.

"Firewall–Systeme", Pohlmann N.; Funkschau, De, Franzis–Verlag K.G. Munchen, vol. 71, No. 17, pp. 63–67.

"ISDN–Firewall Mehr Sicherheit Fuer ISDN–TK Anlagen", G. Hornauer, Net–Zeitschrift Fuer Kommunikationsmanagement, De. Huthig Verlag, Heilderberg, vol. 52, No. 3, pp. 62–63.

* cited by examiner

*Primary Examiner*—Hussein El-chanti
(74) *Attorney, Agent, or Firm*—Hoffman, Wasson & Gitler, PC

(57) ABSTRACT

The invention relates to a data link between a first computer (1) and a second computer (2) for transmitting data. The aim of the invention is to provide a data link which is configured in such a way that non authorized third parties are not able to influence said data transmission or to find their way from the outside to one of the computers and to tamper with data. The inventive data link comprises a lock element (6), a first lock gate (7) being placed between said first computer (1) and said lock element (6) and a second lock gate (8) being placed between said second computer (2) and said lock element (6). The first lock gate (7) is closed when the second one (8) is opened and vice-versa.

18 Claims, 1 Drawing Sheet

DATA LINK BETWEEN TWO COMPUTERS AND METHOD FOR TRANSMITTING DATA BETWEEN SAID COMPUTERS

BACKGROUND OF THE INVENTION

Any transmission of data between two computers raises questions of how secure such a transmission is against unauthorized interception or even manipulation of the data or the transmission processes by unauthorized third parties. For companies, banks, and government authorities, an additional security concern arises if their own enterprise-wide computer network is to be protected against attacks from the outside, e.g., from the Internet. Especially if there is an active connection between the enterprise and the Internet, unauthorized access to the internal computer network of an enterprise can jeopardize data security in this computer network.

As described in "The Internet, From Access to 'Zine", AT&T Technology, 1993, pp. 2–9, authored by Deborah Mills-Scofield, and "Firewalls and Security on the Internet, 1996, ISBN, 3-89319-875-x, authored by Cheswick and Bellovin, various computer systems with data links of different designs for data transmission are known. So-called firewalls are used to solve the security problems. At the firewalls the (TCP/IP-) data packets are analyzed, unauthorized access is denied, and authorized requests are permitted. Firewalls do not, however, represent a physical separation between the internal computer network of an enterprise and the outside world. Rather, the data packets are analyzed by software (see Pp. 64, Sect. 3.3, Para. 1 and Page 88, Sect. 3.4, Para. 1 in "Firewalls and Security on the Internet".

As described in "Firewall Systems", authored by N. Pohlmann, a computer system of the type described above is known. A so-called application gateway is used as a lock element between two computers in a computer link. The first computer is, for example, part of the Internet, and the other computer is part, for example, of an in-house intranet. The application gateway ensures the physical disconnection of the two computers in the sense that when one computer is accessed from the other, the accessing computer appears not at its own address, but rather at the address of the application gateway so that individual data transfer processes can no longer be carried out. At the application gateway, software (a so-called proxy) is made available which during the data transfer moves the data packets back and forth between the computers. Even in the case of the computer system described in this article, the data packets are analyzed by software.

By manipulating these software-implemented firewalls from the outside or through some other unauthorized access, it is therefore still possible to obtain access to an in-house computer network from the outside and to threaten data security in an enterprise-wide computer network. If the security requirements of an enterprise are especially stringent, the known firewalls cannot offer adequate security.

It is therefore the object of this invention to make available more effective security mechanisms for stopping attacks by unauthorized third parties on computers on a data link.

SUMMARY OF THE INVENTION

The present invention pertains to a computer system that comprises at least one computer, a second computer, and a data link between the first computer and the second computer for the purpose of transmitting data, whereby in the data link there is a lock element. Between the first computer and the lock element there is a first flood gate (inner flood gate [IFG]). Between the second computer and the lock element there is a second flood gate (outer flood gate [OFG]). When the first flood gate is closed the second flood gate is opened and, vice versa, when the second flood gate is closed the first flood gate is opened.

The invention also pertains to a process for transmitting data between a first computer and a second computer via a data link, whereby the data is transmitted in one direction by the first computer through an opened first flood gate to a lock element. When the first flood gate is closed, and the second flood gate is opened, data is transmitted through the second flood gate to the second computer. When the data moves in the opposite direction the process takes place in the opposite sequence.

The first computer can be, for example, part of an internal enterprise-wide computer network. The second computer can be designed as a computer in the World-Wide Net.

The invention proposes, based on the computer system of the type mentioned above, that the data link be designed as an Integrated Services Digital Network (ISDN) connection according to the Net Terminal Base Adapter (NTBA) Standard, that the transfer of data from the first computer be carried out via a third computer that is located in a common computer network with the first computer and vice versa via the lock element to the second computer, whereby the establishment of a data link and the transfer of data between the third computer and the lock element and between the second computer and the lock element are carried out via the two B-channels of the ISDN connection according to the NTBA Standard.

According to the invention, technical provisions are thus made in the computer system that ensure that it is not technically possible to establish a data link from the first computer to the third computer at the same time as a link is established from the third computer to the second computer. To accomplish this, it is proposed that in each case the two B-channels of an ISDN connection be used to provide a data link from the first computer to the third computer or from the third computer to the second computer. This will make it possible to meet very rigorous security requirements at comparatively low cost.

An ISDN connection according to the NTBA Standard has two bearer channels (B-channels) and a data channel (D-channel). Thus, the ISDN-NTBA configuration allows a maximum of two data-transfer links at one time. The data link is designed in such a way that when the third computer establishes a connection with the lock element in order to transfer data, this requires the two B-channels of the ISDN-NTBA configuration. The lock element is dialed up via one B-channel, and the data transfer link to the lock element is established via the second B-channel (the first flood gate is opened). It is therefore impossible to set up a link between the lock element and the second computer at the same time since the ISDN-NTBA configuration no longer has a free B-channel available (the second flood gate cannot be opened).

If, in the opposite situation, there is already a connection between the second computer and the lock element (second flood gate is opened) via one of the two B-channels, the third computer can no longer set up a link to the lock element (the first flood gate cannot be opened) since, as explained above, this requires both B-channels of the ISDN-NTBA configuration. By making dual use of the same NTBA, i.e., on the one hand at the third computer and on the other at the lock element, the lock function of the data link of the computer system according to the invention can be implemented in a simple fashion.

The lock element is designed as, e.g., a computer. The data link of the computer system according to the invention produces a slight time delay in data transfer that the user will hardly notice. During this time delay the flood gates are opened and closed and the data to be transferred is analyzed. By properly controlling the sequence of the individual steps in the data transfer, the time delay can be reduced to a minimum.

According to an advantageous enhancement of the invention, it is proposed that the first computer be located in a first computer network. The first computer is preferably designed as a server for a computer network, and the first computer network is preferably designed as an internal enterprise-wide network. In such in-house computer networks, data security is especially important. Many enterprises have now begun to handle a large portion of their company business completely electronically via their in-house computer networks. Unauthorized access to these computer networks from the outside or manipulation of the data contained therein can do extremely serious damage to the enterprise. In this respect the data link of the computer system according to the invention represents a remedy.

According to another advantageous enhancement of the computer system according to the invention, it is proposed that the second computer be located in a second computer network. The second computer is preferably designed as an Internet server, and the second computer network is preferably the Internet. Attacks by third parties across the Internet on the in-house computer networks connected to the Internet pose a particularly serious threat to data security in such enterprises.

When data are transmitted from a computer in an in-house computer network to a computer on the Internet, data security is of especially great importance since theoretically millions of Internet users could penetrate the in-house computer network without permission and manipulate the data stored therein. Moreover, in the world-wide Internet, which is accessible to everyone, there are many so-called viruses and Trojan horses in circulation that can pose a serious threat to the data stores of the enterprise once they have penetrated the enterprise's in-house computer network. The data link of the computer system according to the invention offers a suitable platform for ensuring secure and reliable protection against viruses, etc. To accomplish this, a suitable means of analysis must be present in the data link, preferably in the lock element.

According to another advantageous enhancement of the invention, it is proposed that there be a third computer in the first computer network and that there be a fourth computer in the lock element.

The fourth computer may be located inside the lock element in its own network environment which, however, must be physically separated from both the first computer network and from the second computer network. The idea of the fourth computer is to carry out various analysis processes within the lock element and thus to provide a certain amount of pre-selection. The third computer is also connected to the ISDN connection. The fourth computer is not connected directly to the ISDN-NTBA configuration since it is connected (via a separate network) to the lock element.

To transmit data, the data to be transmitted is sent from the first computer to the third computer. In the third computer the data is analyzed and checked. The analysis of the data to be sent can be done on the first computer. Only if the check has revealed no anomalies will the first flood gate be opened. Then the data is sent from the third computer to the lock element, and then the first flood gate is closed again. Only after the first flood gate is completely closed will the second flood gate be opened. Then the data will be sent from the lock element to the second computer, and then the second flood gate will again be closed.

To receive data, the second flood gate is opened and the data to be received are transmitted from the second computer to the gate element. Then the second flood gate is closed, and only once it has been completely closed will the first flood gate be opened. Then the data will be sent from the lock element to the third computer. Then the first flood gate will be closed, and then the third computer will check and analyze the data.

Only when the check has revealed no anomalies will the data be sent from the third computer to the first computer.

The fact that the two computers and the two computer networks are physically separated from one another prevents on-line attacks from the outside against one of the computers in a computer network and makes it impossible to manipulate from the outside the analysis processes that are carried out in the third computer.

It is advantageous for the link between the first computer and the second computer to be structured as an Integrated Services Digital Network (ISDN) connection according to the Net Terminal Base Adapter (NTBA) Standard.

As another way of accomplishing the object of this invention, it is proposed, based on the process of the type mentioned above, that the data link be designed as an Integrated Services Digital Network (ISDN) connection according to the Net Terminal Base Adapter (NTBA) Standard, that the data from the first computer be transferred via a third computer that is located in a common computer network with the first computer, and via the lock element to the second computer, and vice versa, and that to establish a data link and to transfer data between the third computer and the lock element and between the second computer and the lock element, the two B-channels of an ISDN connection according to the NTBA Standard be used.

According to an advantageous enhancement of this invention, it is proposed that an analysis of the data to be transferred be performed in the third computer. The analysis should preferably be performed according to semantic criteria.

At no time during the data transfer is the third computer directly connected to the second computer network or to the second computer. This is prevented by the flood gates, which are never opened at the same time when data are being transferred. Thus it is impossible for unauthorized third parties to gain direct access to the third computer during a data transfer or to manipulate the analysis mechanism contained in the third computer.

In the lock element itself, by contrast, no analysis of the data to be transferred is performed since, in order to transfer data, the lock element is in direct contact with the second computer network or with the second computer for a certain length of time. During this period of time, an analysis mechanism contained in the lock element could be manipulated by unauthorized third parties.

If the data is sent via the opened first flood gate from the lock element to the third computer, infected data files, i.e., data files that contain viruses or Trojan horses, could admittedly be stored in the third computer. However, here there is a decisive difference compared to the operation of known firewalls. Instead of carrying out all analysis processes on line, the third computer is able, depending on the desired scalable depth and duration of the analysis, to examine and, optionally, to destroy the passive data that the lock element has received from the second computer network without risk of access from the outside or of interactive manipulation.

Within the framework of the semantic analysis of the data, it is possible to check whether the content of certain data files can leave the in-house computer network and go outside. During the semantic analysis of data files, in particular these systems for electronic communication (e-mail) are checked since documents of any kind can be dispatched over them. In the process according to the invention, it is possible to perform a semantic analysis since the analysis times can be structured in a flexible manner.

According to a preferred embodiment of invention, to send data it is proposed:

that the data to be sent be sent from the first computer to the third computer, that the third computer analyze and check the data, that the first flood gate be opened, that the data be sent from the third computer (INS) to the gate element, that the first floodgate be closed, that the second flood gate be opened, that the data be sent from the lock element to the second computer, and that the second flood gate be closed.

According to a preferred embodiment of invention, to receive data it is proposed:

that the second flood gate be opened, that the data to be received be sent from the second computer to the lock element, that the second flood gate be closed, that the first flood gate be opened, that the data be sent from the lock element to the third computer, that the first flood gate be closed, that the third computer analyze and check the data, and that the data be sent from the third computer to the first computer.

The first flood gate is preferably driven by the third computer, and the second flood gate is preferably driven by the lock element.

According to an advantageous enhancement of the process according to the invention, the data to be received is sent from the lock element to the third computer at the time when the data to be sent is also sent from the third computer to the lock element. In this way two different data transfer steps can be carried out in one time-step. A prerequisite for this is that the positions of the flood gates be the same at this point in time. In the case of this enhancement, specifically the first flood gate is opened and the second flood gate is closed.

According to another advantageous enhancement of the invention, the data to be received is sent from the second computer to the lock element at the point in time when the data to be sent is also sent from the lock element to the second computer. At this point in time, the first flood gate is closed and the second flood gate is opened.

According to another enhancement of the process according to the invention, the analysis of the received data is carried out at the same time as the data to be sent is analyzed.

The analysis of the data is preferably done in the third and/or the fourth computer. The analysis of the data to be sent can, however, also be carried out in the first computer.

In principle, it is possible in one time-step to carry out the data transfer steps in which the positions of the flood gates are the same.

BRIEF DESCRIPTION OF THE DRAWINGS

A preferred embodiment of the invention in question is explained in greater detail below based on the drawing.

DETAILED DESCRIPTION OF THE INVENTION

Figure 1:
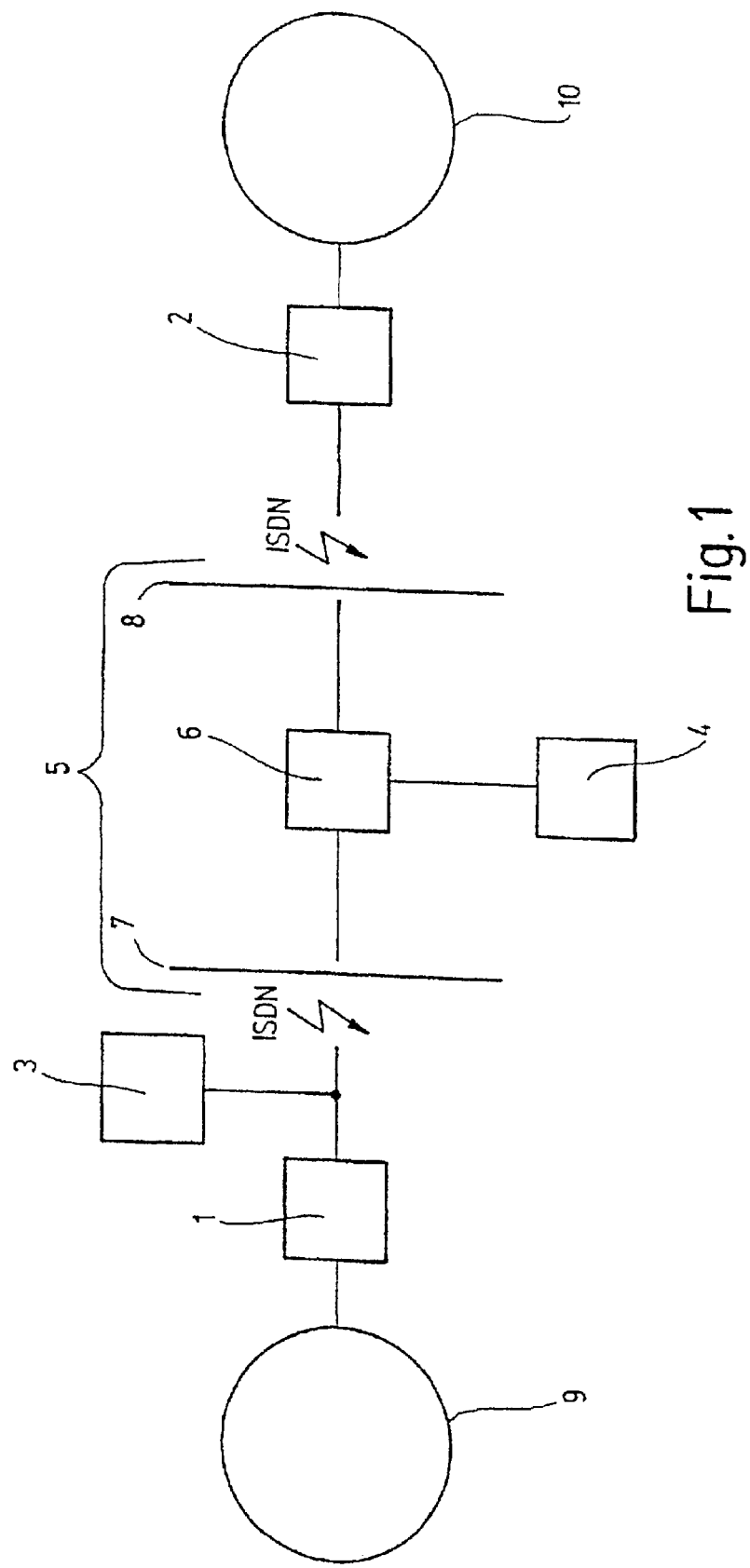
FIG. 1 shows a computer system according to the invention.

FIG. 1 shows a data link for the purposes of transferring data between first computer 1 and a second computer 2. In the data link there is a lock element 6, whereby a first flood gate 7 is located between first computer 1 and lock element 6 and a second flood gate 8 is located between second computer 2 and lock element 6. First flood gate 7 is closed when second flood gate 8 is opened, and, vice versa, second flood gate 8 is closed when first flood gate 7 is opened.

First computer 1 is located in a first computer network 9, whereby first computer 1 is designed as a server for a computer network and first computer network 9 is designed as an enterprise-wide in-house computer network. Second computer 2 is located in a second computer network 10, whereby second computer 2 is designed as an Internet server and second computer network 10 is the Internet. In first computer network 9 there is a third computer 3, and in lock element 6 there is a fourth computer 4.

The purpose of fourth computer 4 is to carry out various analysis processes inside lock element 6 and thus to perform a certain amount of pre-selection.

In order now to send data from first computer 1 to second computer 2, the data to be sent is first sent from first computer 1 to third computer 3. In third computer 3, the data is analyzed and checked. The analysis is preferably carried out based on semantic criteria. Only if the analysis has revealed no anomalies will first flood gate 7 be opened. Then the data will be sent from third computer 3 to lock element 6, and then first flood gate 7 will be closed again. Only after first flood gate 7 is completely closed will second flood gate 8 be opened. Then the data is sent from lock element 6 to second computer 2, and then second flood gate 8 is closed again.

In order for data from second computer 2 to be received by first computer 1, second flood gate 8 is first opened and the data to be received is sent from second computer 2 to lock element 6. Then second flood gate 8 is closed, and only when it is completely closed will first flood gate 7 be opened. Then the data is sent from lock element 6 to third computer 3. Then first flood gate 7 is closed. Then third computer 3 checks and analyzes the data. Only if the analysis has revealed no anomalies will the data be sent from third computer 3 to first computer 1.

Lock element 6 between first computer 1 and second computer 2 ensures a physical separation between first computer 1 and second computer 2 and between both computer networks 9, 10. This makes it possible to ward off on-line attacks from the outside on first computer 1 in computer network 9, and it is impossible to manipulate from the outside the analysis processes that are carried out in third computer 3 since a direct attack from the outside on third computer 3 is not possible because of lock element 6.

The data link between first computer 1 and second computer 2 is designed as an Integrated Services Digital Network (ISDN) connection 5 according to the Net Terminal Base Adapter (NTBA) Standard. Third computer 3 is also connected to ISDN connection 5. Fourth computer 4 is not directly attached to the ISDN-NTBA since it is connected (via a separate network) to lock element 6. In this way the function of lock element 6 can be implemented in a simple and efficient way. ISDN connection 5 according to the NTBA Standard has two bearer channels (B-channels) and a data channel (D-channel). Thus an ISDN-NTBA configuration allows a maximum of two data transfer links at one time.

If third computer 3 sets up a link with lock element 6 in order to transfer data, two B-channels are required for this purpose: lock element 6 is dialed up via the one B-channel, and via the second B-channel the data transfer link to lock element 6 is established. ISDN connection 5 that is established between third computer 3 and lock element 6 corresponds to a flood-gate position in which first flood gate 7 is opened and second flood gate 8 is closed. For technical reasons, therefore, it is not possible to connect lock element 6 to second computer 2 (second flood gate 8 is opened) at the same time in ISDN-NTBAs.

If, on the other hand, a link already exists between second computer 2 in second computer network 10 and lock element 6 (second flood gate 8 is opened), third computer 3 can no longer establish a connection with lock element 6 (first flood gate 7 cannot be opened) since, as explained above, this requires both B-channels of the ISDN-NTBA.

What is claimed is:

1. A computer system between at least a first computer (1) and a second computer (2) including a data link between the first computer (1) and the second computer (2), for the purpose of transmitting data between the first computer (1) and the second computer (2), comprising:

a lock element (6) provided in the data link between the first computer (1) and the second computer (2);

a first flood gate (7) provided between the first computer (1) and said lock element (6);

a second flood gate (8) provided between said lock element (6) and the second computer (2);

a third computer (3) provided between the first computer (1) and said first flood gate (7);

wherein the data link is an Integrated Service Digital Network (ISDN) connection according to the Net Terminal Base Adaptor (NTBA) standard, said ISDN connection including two B-channels for the establishment of a data transfer between the first computer (1) and said first flood gate (7) accomplished through said third computer (3), and further wherein said data transfer between said third computer (3) and said lock element (6) as well as said data transfer between said lock element (6) and the second computer (2) takes place through said two B-channels of said ISDN connection according to the NTBA standard, and further wherein said first flood gate (7) is closed when said second flood gate (8) is opened and said first flood gate (7) is opened when said second flood gate (8) is closed.

2. The computer system according to claim 1, wherein the first computer (1) is arranged in a first computer network (9).

3. The computer system according to claim 1, wherein the second computer (2) is arranged in a second computer network (10).

4. The computer system according to claim 2, wherein the first computer (1) is designed as a server for a computer network and first computer network (9) is designed as an in-house enterprise-wide computer network.

5. The computer system according to claim 3, wherein the second computer (2) is designed as an Internet server and said second computer network (10) is the Internet.

6. The computer system according to claim 4, wherein said third computer (3) is arranged in said first computer network (9) and further including a fourth computer (4) is arranged in said lock element (6).

7. A process for transferring data between a first computer (1) and a second computer (2) through a third computer (3) via a data link through first and second flood gates and a lock element (6) provided between said first and second flood gates, said third computer provided between said first computer and said first flood gate, wherein said data link is designed as an Integrated Services Digital Network (ISDN) connection according to the Net Terminal Base Adapter (NTBA) standard, said ISDN connection including two B-channels for the establishment of a data transfer between said first computer (1) and said first flood gate (7) accomplished through said third computer (3), and further wherein said data transfer between said third computer (3) and said lock element (6) as well as said data transfer between said lock element (6) and said second computer (2) takes place through said two B-channels of said ISDN connection according to the NTBA standard, comprising the steps of:

transferring data from said first computer (1) to said lock element (6) only when said first flood gate (7) is opened and said second flood gate (8) is closed; and transferring data from said second computer (2) to said lock element (6) only when said second flood gate (8) is opened and said first flood gate (7) is closed.

8. The process according to claim 7, including the step of analyzing the data to be transmitted in said third computer (3).

9. The process according to claim 8, wherein said analyzing step is carried out based on semantic criteria.

10. The process according to claim 8, wherein the depth and duration of said analysis step are adjusted individually.

11. The process according to claim 7, wherein, for sending data including the steps of:

sending data from said first computer (1) to said third computer (3);

analyzing data in said third computer;

opening said first flood gate (7);

sending data from said third computer (3) to said lock element (6);

closing said first flood gate (7);

opening said second flood gate (8);

sending data from said lock element (6) to said second computer (2); and closing said second flood gate.

12. The process according to claim 7, for receiving data including the steps of:

opening said second flood gate (8);

sending data received from said second computer (2) to said lock element (6);

closing said second flood gate (8);

opening said first flood gate (7);

sending data from said lock element (6) to said third computer (3);

closing said first flood gate (7);

analyzing and checking the data in said third computer; and sending data from said third computer (3) to said first computer (1).

13. The process according to claim 11, wherein the data to be received is sent from said lock element (6) to said third computer (3) at the point in time when the data to be sent is also being sent from said third computer (3) to said lock element (6).

14. The process according to claim 12, wherein the data to be received is sent from said lock element (6) to said third computer (3) at the point in time when the data to be sent is also being sent from said third computer (3) to said lock element (6).

15. The process according to claim 11, wherein the data to be received is sent from said second computer (2) to said lock element (6) at the point in time when the data to be sent is also being sent from said lock element (6) to said second computer (2).

16. The process according to claim 12, wherein the data to be received is sent from said second computer (2) to said lock element (6) at the point in time when the data to be sent is also being sent from said lock element (6) to said second computer (2).

17. The process according to claim 11, wherein the analysis of the received data is carried out at the same time as the data to be sent is being analyzed.

18. The process according to claim 12, wherein the analysis of the received data is carried out at the same time as the data to be sent is being analyzed.

* * * * *